United States Patent
Hannecart

(10) Patent No.: US 10,077,678 B2
(45) Date of Patent: Sep. 18, 2018

(54) COMPOSITE ANNULAR CASING OF A COMPRESSOR FOR A TURBO MACHINE

(71) Applicant: Techspace Aero S.A., Herstal (Milmort) (BE)

(72) Inventor: Benoit Hannecart, Herve (BE)

(73) Assignee: Safran Aero Boosters SA (BE)

( * ) Notice: Subject to any disclaimer, the term of this patent is extended or adjusted under 35 U.S.C. 154(b) by 373 days.

(21) Appl. No.: 14/565,468

(22) Filed: Dec. 10, 2014

(65) Prior Publication Data

US 2015/0167497 A1    Jun. 18, 2015

(30) Foreign Application Priority Data

Dec. 13, 2013  (EP) ..................................... 13197094

(51) Int. Cl.
*F01D 25/24* (2006.01)
*B29C 70/48* (2006.01)
(Continued)

(52) U.S. Cl.
CPC .......... *F01D 25/24* (2013.01); *B29C 45/1459* (2013.01); *B29C 70/48* (2013.01);
(Continued)

(58) Field of Classification Search
CPC ...... F01D 25/14; F01D 25/005; F01D 25/243; B29C 45/1459; B29C 70/48;
(Continued)

(56) References Cited

U.S. PATENT DOCUMENTS 4,063,847 A * 12/1977 Simmons ................ F01D 25/24
                                                      415/185
5,639,535 A    6/1997 McCarville
(Continued)

FOREIGN PATENT DOCUMENTS

EP    1900502 A1    3/2008
EP    1938953 A1    7/2008
(Continued)

OTHER PUBLICATIONS

Thomas, G.P., Resin Transfer Moulding (RTM)—Methods, Benefits, and Applications, Apr. 29, 2013, http://www.azom.com/article.aspx?ArticleID=8620.*

(Continued)

*Primary Examiner* — Jason Shanske
*Assistant Examiner* — Wayne A Lambert
(74) *Attorney, Agent, or Firm* — Sandberg Phoenix & von Gontard P.C.

(57) ABSTRACT

The invention relates to a composite annular casing for a low-pressure compressor of a turbo machine, including a wall of generally circular form or in a circular arc; a mounting flange extending radially from one side of the wall, forming an edge together with the wall; a main fibrous reinforcement (38) extending in a continuous manner along the wall and the flange and forming an angled portion and rounded in the area of the edge; an auxiliary fibrous reinforcement (56) extending along the edge; and a matrix. The auxiliary reinforcement (56) comprises a core extending along the edge in such a way as to occupy the volume between the edge and the angled portion of the main reinforcement (38). The invention also relates to a turbo machine comprising a composite annular casing, as well as to a method of manufacturing a composite annular casing of a turbo machine.

2 Claims, 6 Drawing Sheets

(51) Int. Cl.
  *B29C 70/76* (2006.01)
  *B29D 99/00* (2010.01)
  *F01D 25/00* (2006.01)
  *B29C 45/14* (2006.01)

(52) U.S. Cl.
  CPC ........ *B29C 70/766* (2013.01); *B29D 99/0014* (2013.01); *F01D 25/005* (2013.01); *F01D 25/243* (2013.01); *F05D 2300/603* (2013.01); *Y10T 29/49323* (2015.01)

(58) Field of Classification Search
  CPC .............. B29C 70/766; B29D 99/0014; F05D 2300/603; F05D 2240/14; F05D 25/24
  USPC ....................................................... 415/214.1
  See application file for complete search history.

(56) References Cited

U.S. PATENT DOCUMENTS

| | | | | |
|---|---|---|---|---|
| 7,132,380 | B2* | 11/2006 | Bottger | D03D 1/0052 2/2.5 |
| 9,017,021 | B2* | 4/2015 | Verseux | F01D 21/045 415/200 |
| 2008/0157418 | A1* | 7/2008 | Blanton | B29C 53/587 264/103 |
| 2012/0270006 | A1* | 10/2012 | McMillan | F01D 25/243 428/77 |
| 2013/0207303 | A1* | 8/2013 | Marlin | B29C 70/32 264/257 |
| 2013/0309085 | A1* | 11/2013 | Panayil | F04D 19/02 415/214.1 |
| 2016/0031182 | A1* | 2/2016 | Quinn | D03D 25/005 428/113 |

FOREIGN PATENT DOCUMENTS

| | | |
|---|---|---|
| EP | 2077183 A1 | 7/2009 |
| GB | 2486231 A | 6/2012 |

OTHER PUBLICATIONS

European Search Report from corresponding EP 13197094.9 dated May 27, 2014.

* cited by examiner

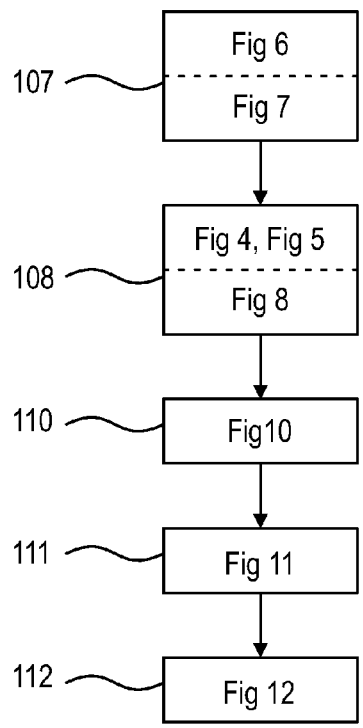
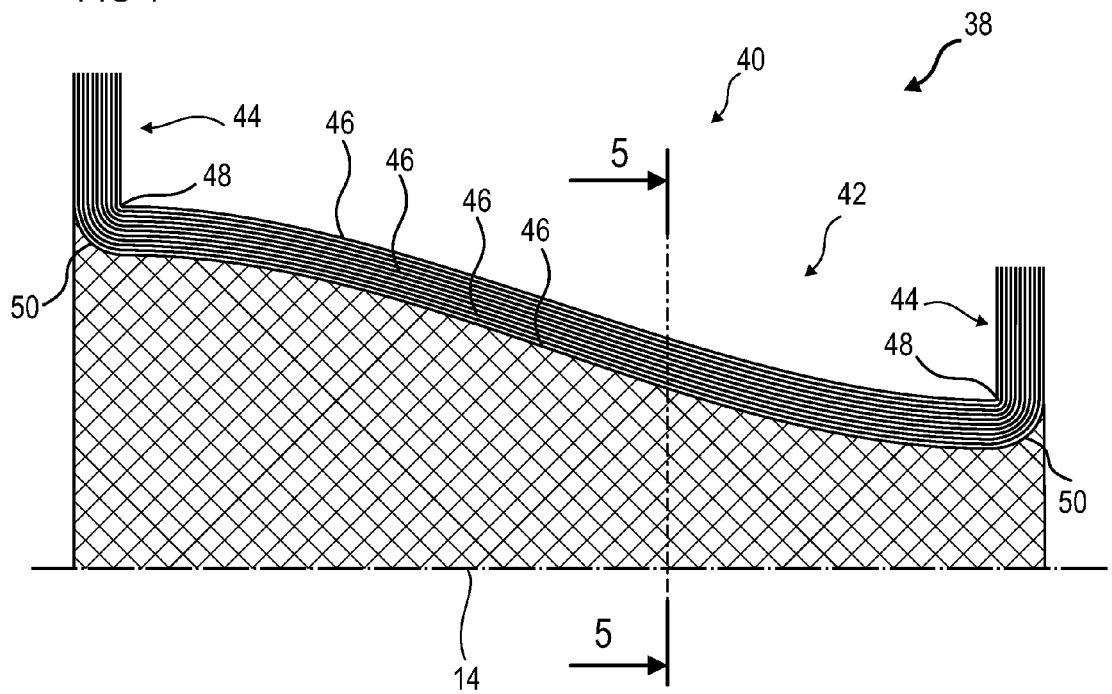

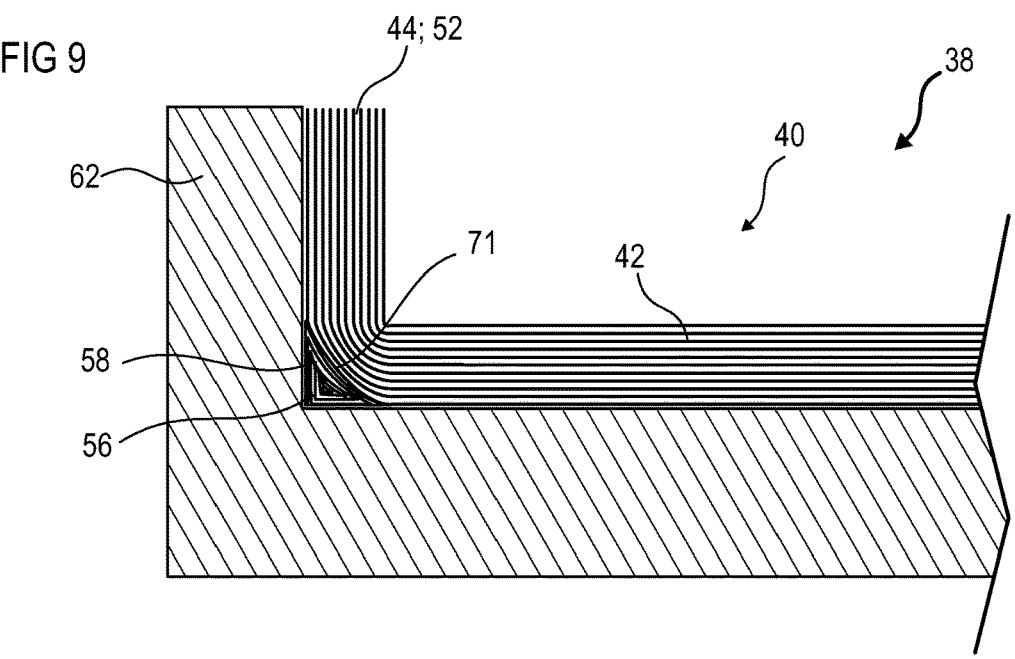
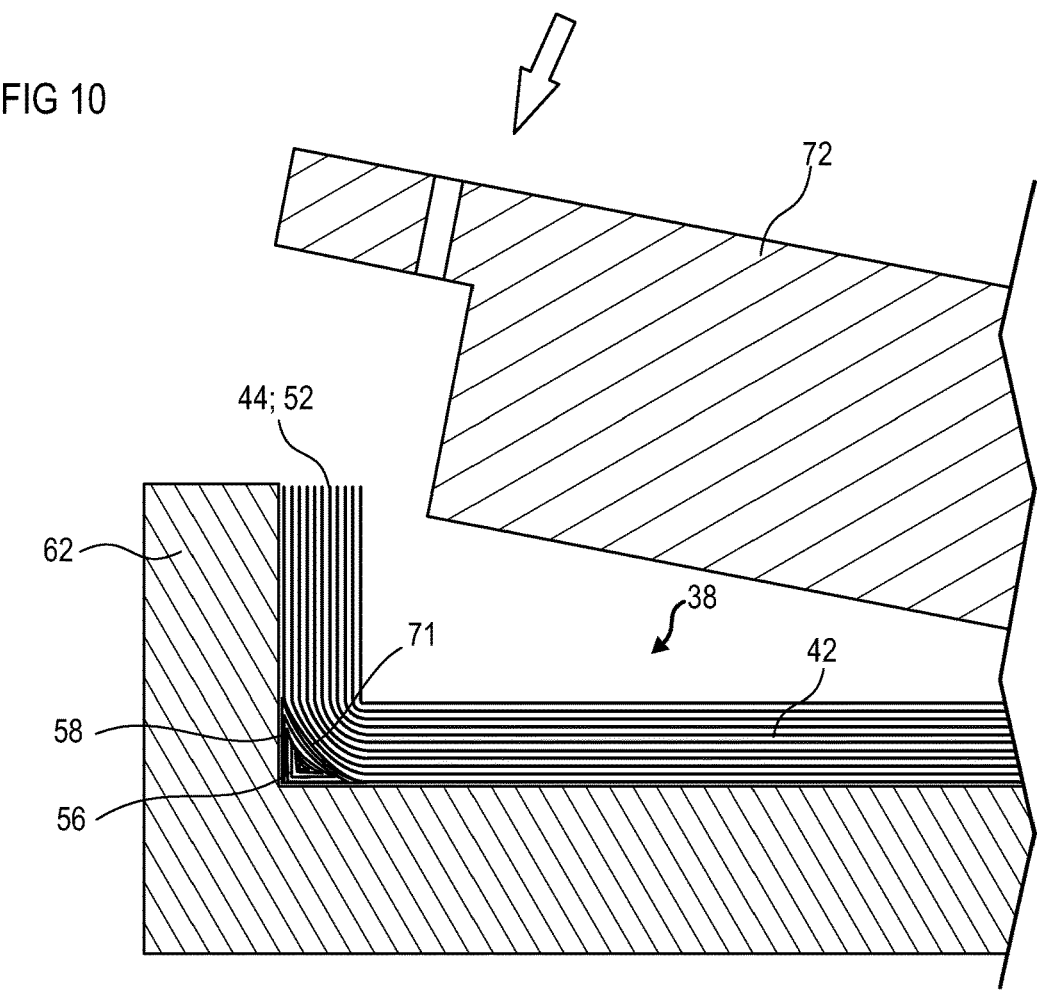

COMPOSITE ANNULAR CASING OF A COMPRESSOR FOR A TURBO MACHINE

This application claims the benefit, under 35 U.S.C. § 119, of EP 13197094.9, filed Dec. 13, 2013, the disclosure of which is incorporated herein by reference in its entirety.

FIELD

The invention relates to a composite external annular casing for an axial turbo machine. More precisely, the invention relates to a composite annular casing for an axial turbo machine having a circular wall, a radial annular flange and a sharp edge at their junction, the composite comprising a fibrous preform. The invention also relates to an axial turbo machine comprising a composite annular casing. The invention also relates to a method of manufacturing a composite annular casing for an axial turbo machine.

BACKGROUND

The statements in this section merely provide background information related to the present disclosure and may not constitute prior art.

With the aim of lightening a turbo machine, certain of its components that are conventionally produced from metal may be produced from a composite material. Structural components such as supports and casings may be produced from a composite material. In particular, an external casing of a compressor, in particular low pressure, may be produced from a composite material.

Such a casing generally has a cylindrical portion which supports annular rows of blades, and annular mounting flanges which extend radially. The flanges permit the assembly of the compressor casing on an intermediate blower casing, and the mounting of an annular separation nose. The internal surface of the casing permits the annular flow to be guided along the compressor, and must have a smooth surface for this purpose, without projections. This constraint requires sharp edges to be produced in the area of the mounting flanges.

A composite external casing of a compressor may be produced from a preform densified by a matrix. The preform may be formed by a stack of fibrous sheets stacked one on top of the other, the sheets extending both over the cylindrical portion and over the mounting flanges. Once positioned in the mould, the preform is arranged in an injection mould having edges intended to reproduce the desired form of the casing. The stacked preform forms a rounding in the area of the edge of the mould and leaves an empty space in this location. In the course of the injection, the space is occupied by the resin without being reinforced by fibers. Consequently, the composite casing has a weakness in this location.

Document GB 2486231 discloses a tool for the shaping of a preform of a composite casing for a turbo machine, the casing having radial annular flanges at its upstream and downstream extremities. The preform comprises a stack of folds which are formed in the shaping tool, in such a way as to produce the annular flanges. In order to limit the appearance of rounding of the preform beneath the flanges during its shaping, the tool comprises mobile blocks forming the flanges, the preform being arranged beforehand in a membrane in which aspiration is created. This approach makes it possible to come closer to a desired geometry, although it does require expensive tooling. Furthermore, the rounding occupied by the preform depends on the thickness of the lower fold. The rounding can be distorted because of the aspiration.

Document EP 1 900 502 A1 discloses an annular composite component of a turbo machine. The component has an annular body and annular flanges at its extremities, and annular sharp edges in the interior of the flanges. The composite component comprises a plurality of fibrous reinforcements, one of which is frayed in the area of the edges in such a way as to distribute the fibers there in the junctions between the flanges and the annular body. The approach of this document makes it possible to distribute fibers in the junctions, but gives rise to heterogeneity in the density of the fibers. This heterogeneity reduces the mechanical strength of the composite component, and in particular in response to a bending effort applied to a flange.

SUMMARY

The object of the invention is to overcome at least one of the problems presented by the prior art. The object of the invention is also to reinforce an annular junction between a mounting flange and a circular wall of a composite external annular casing of a turbo machine. The object of the invention is also to reinforce as far as possible a sharp edge beneath an annular flange of the composite external annular casing of a turbo machine.

The invention relates to a composite annular casing for a turbo machine, in particular a low-pressure compressor, including a wall of generally circular form or in a circular arc, a mounting flange extending radially from one side of the wall, forming an edge together with the wall, and a main fibrous reinforcement extending in a continuous manner along the wall and the flange forming an angled portion that is also rounded in the area of the edge. The annular casing additionally includes an auxiliary fibrous reinforcement extending along the edge and a matrix, wherein the auxiliary reinforcement comprises a core extending along the edge in such a way as to occupy the volume between the edge and the angled portion of the main reinforcement.

According to various embodiments of the invention, the core of the auxiliary reinforcement comprises a preferably braided or woven strand, where appropriate in a three-dimensional manner.

According to various embodiments of the invention, the transverse section of the core of the auxiliary reinforcement has a profile of generally triangular form, and where appropriate, a right-angled triangle of which the right angle is arranged in the area of the sharp edge.

According to various embodiments of the invention, the main reinforcement and the auxiliary reinforcement are essentially in contact over the whole of the radial thickness of the wall and/or over the whole of the axial thickness of the mounting flange.

According to various embodiments of the invention, the core of the auxiliary reinforcement comprises fibers which extend radially from the edge as far as the main reinforcement, the core of the auxiliary reinforcement preferably having a homogeneous fiber density perpendicularly to its prolongation.

According to various embodiments of the invention, the mounting flange is an annular mounting flange and/or an axial mounting flange, the annular casing preferably being an annular case-half extending over a semi-circle which comprises axial flanges arranged laterally on the cylindrical portion and opposing annular flanges arranged at the axial extremities of the cylindrical portion.

According to various embodiments of the invention, the fibers of the core of the auxiliary reinforcement extend in principle parallel to the edge, each portion of fibers of the auxiliary reinforcement (56) preferably being inclined in relation to the edge at an angle of less than 40°, and more preferably of less than 20°.

According to various embodiments of the invention, the core of the auxiliary reinforcement comprises fibers having the same nature as the main reinforcement, the fibers of the main reinforcement and of the core of the auxiliary reinforcement, in various embodiments, being of the same length and/or of the same diameter.

According to various embodiments of the invention, the fibers of the main reinforcement and of the core of the auxiliary reinforcement are intertwined at the interface between the main reinforcement and the auxiliary reinforcement, the fibers of the reinforcements, in various embodiments, being arranged in bundles of fibers which are intertwined across the interface.

According to various embodiments of the invention, the main reinforcement and the core of the auxiliary reinforcement each have a homogeneous fiber density, the ratio of the densities of the fibers of the reinforcements can be between 0.5 and 1.50, for example between 0.80 and 1.20, e.g., between 0.95 and 1.05.

According to various embodiments of the invention, the section of the core is symmetrical.

According to various embodiments of the invention, each portion of fiber of the core is inclined in relation to the axis of prolongation of the casing at an angle of between 50° and 130°, for example between 60° and 120°, e.g., between 75° and 105°.

According to various embodiments of the invention, the core adopts the form of the main reinforcement over the majority, and in various embodiments over the whole of the radial height of the core.

According to various embodiments of the invention, the casing has a continuity of material between the mounting flange and the wall.

According to various embodiments of the invention, the envelope of the core delimits a space which occupies at least 15%, for example at least 25%, e.g., at least 35% of the junction between the flange and the wall of the annular casing.

According to various embodiments of the invention, the matrix and the core form the sharp edge.

According to various embodiments of the invention, the casing comprises a flange extending perpendicularly to the wall.

The invention also relates to a composite part, in particular of a turbo machine, that includes a structural wall, a mounting flange extending perpendicularly from one side of the structural wall and forming an edge with the wall, and a matrix. The composite part additionally includes a main fibrous reinforcement extending in a continuous manner along the wall and the flange and forming an angled portion that is also rounded in the area of the edge, and an auxiliary fibrous reinforcement extending along the edge, wherein the auxiliary reinforcement comprises a core with fibers extending radially over the majority, and, in various embodiments, over the totality of the thickness of the structural wall, and/or wherein the core extends along the edge in such a way as to occupy the volume between the edge and the angled portion of the main reinforcement.

The invention also relates to a turbo machine comprising a composite annular casing, wherein the composite annular casing is in accordance with the invention, the matrix can be an organic matrix on the basis of polyetherimide, epoxy, or polyether ether ketone. The main reinforcement being a fibrous preform comprising a stack of fibrous folds with carbon fibers and glass fibers, each fibrous fold comprising fibers arranged in bundles of woven fibers in at least two directions.

According to various embodiments of the invention, the turbo machine comprises an intermediate blower casing, a low-pressure compressor with annular rows of stationary blades and a separation nose. The annular casing comprises an annular mounting flange at each axial extremity, of which one is an upstream flange and one is a downstream flange. The annular casing has a reduction in its radius in the downstream direction. The annular casing can be an external principal structure of the compressor to which the rows of blades are attached, the separation nose being attached via the upstream flange, the intermediate blower casing being attached via the downstream flange, and the annular casing additionally comprising a sandwich structure of annular layers of abradable material and annular surfaces for the mounting of the blades. The annular casing can be formed from half shells separated by an axially extending plane.

The invention also relates to a method of manufacturing a composite annular casing of a turbo machine that comprises a wall having a generally circular profile or in a circular arc, a mounting flange extending radially from one side of the wall and forming an edge with the wall. The method comprises the following stages: (a) positioning of an auxiliary reinforcement in a corner of a moulding surface of an injection mould, the corner forming the edge; (b) positioning of a main reinforcement against the moulding surface by adapting their form to that of the auxiliary reinforcement in the area of the corner; (c) closing of the injection mould; (d) injection of a resin and polymerization of the resin; (e) demoulding of the casing.

According to various embodiments of the invention, ahead of the stage (b) of positioning a main reinforcement, the reinforcement is produced with a rounding intended to come into contact with a contact surface of the auxiliary reinforcement, preferably on completion of the stage (b), the rounding of the main reinforcement being flattened and the contact surface of the auxiliary reinforcement being curved inwards.

According to various embodiments of the invention, in the course of stage (c) closing of the injection mould, the main reinforcement is compacted and/or the main reinforcement and the core are mutually compacted.

According to various embodiments of the invention, at the moment of the closing of the mould, the core adapts its form over the entirety of its radial height to that of the surface of the mould which forms the flange.

The invention makes it possible to reinforce a sharp edge of the casing of a turbo machine. The fiber density at that point is homogeneous, which optimizes the mechanical strength. The distribution of the fibers to either side of the edge may be symmetrical, which improves the mechanical properties. The method makes it possible to produce a sharp edge with accurate dimensions and a sharpened edge without the need for additional machining.

DRAWINGS

FIG. 3 is a diagram depicting the method of manufacturing a casing according to various embodiments of the invention.

FIG. 4 illustrates in schematic form a main fibrous reinforcement of the casing according to various embodiments of the invention.

FIG. 9 illustrates an intermediate state of the method, in which the reinforcements are arranged in the mould according to various embodiments of the invention.

FIG. 10 illustrates the stage of the method of closing the mould according to various embodiments of the invention.

Corresponding reference numerals indicate corresponding parts throughout the several views of drawings.

DETAILED DESCRIPTION

Figure 1:
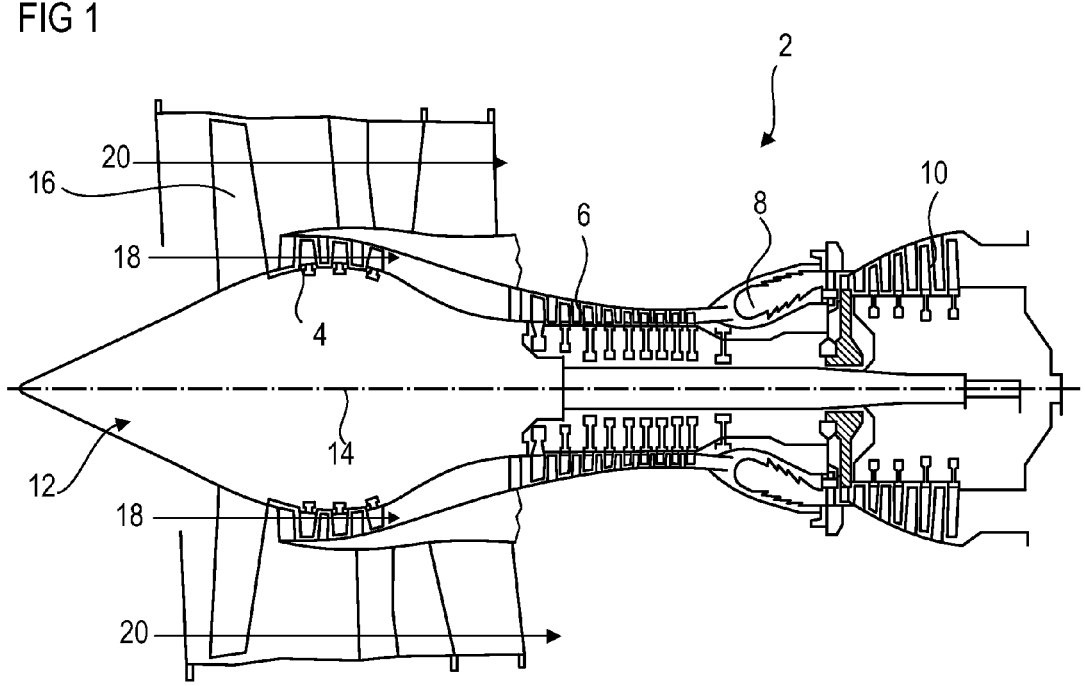
FIG. 1 illustrates an axial turbo machine according to various embodiments of the invention.

The following description is merely exemplary in nature and is in no way intended to limit the present teachings, application, or uses. Throughout this specification, like reference numerals will be used to refer to like elements.

In the context of the following description, the expressions interior or internal and exterior or external relate to positioning in relation to the axis of rotation of an axial turbo machine.

FIG. 1 illustrates an axial turbo machine in a simplified manner. The turbo machine in this particular case is a turbofan engine. The turbofan engine 2 comprises a first compression stage, referred to as the low-pressure compressor 4, a second compression stage, referred to as the high-pressure compressor 6, a combustion chamber 8 and one or a plurality of turbine stages 10. In operation, the mechanical power of the turbine 10 transmitted via the central shaft as far as the rotor 12 sets the two compressors 4 and 6 in motion. A gear reduction mechanism can be used to increase the speed of rotation transmitted to the compressors 4 and 6. Or, each of the different turbine stages 10 can be connected to the compressor stages 4 and 6 via concentric shafts. These latter include several rows of rotor blades associated with rows of stationary blades. The rotation of the rotor 12 about its axis of rotation 14 thus makes it possible to produce an air flow and to compress the latter progressively as far as the entrance to the combustion chamber 8.

An inlet blower commonly referred to as a fan 16 is coupled to the rotor 12 and generates a flow of air which is divided into a primary flow 18 passing through the various stages referred to above of the turbo machine, and a secondary flow 20 passing through an annular conduit (partially illustrated) along the machine before rejoining the primary flow as it exits from the turbine. The primary flow 18 and the secondary flow 20 are annular flows, and they are channelled through the casing of the turbo machine.

Figure 2:
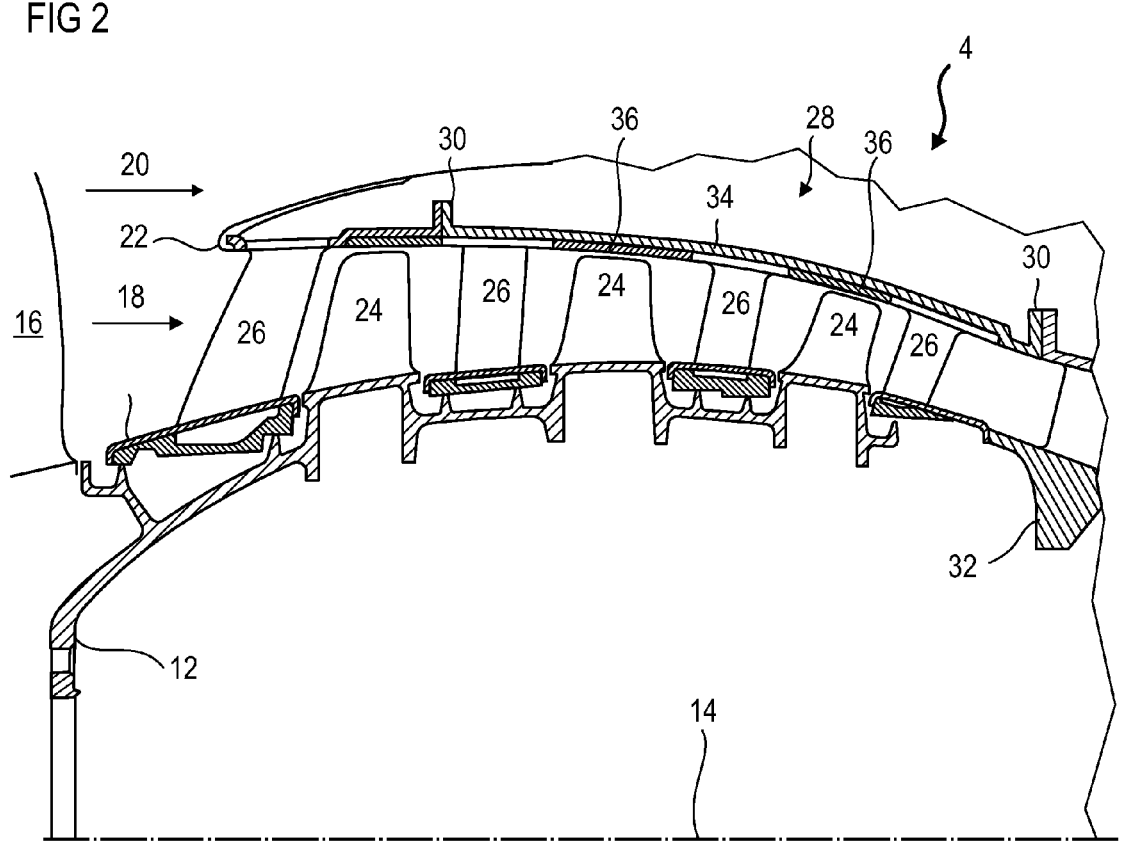
FIG. 2 is a drawing of a compressor of a turbo machine according to various embodiments of the invention.

FIG. 2 is a cross-sectional view of a compressor of an axial turbo machine 2 such as that depicted in FIG. 1. The compressor can be a low-pressure compressor 4. The presence of a part of the fan 16 and the separation nose 22 for the primary flow 18 and the secondary flow 20 can be noted there. The rotor 12 comprises a plurality of rows of rotor blades 24, being three in number in this particular case.

The compressor comprises a plurality of rectifiers, being four in number in this particular case, each of which contains a row of stationary blades 26. The rectifiers are each associated with a row of rotor blades 24 in order to rectify the flow of air, in such a way as to convert the flow velocity under pressure.

The compressor comprises at least one casing 28. The casing 28 can have a generally annular form with a revolution profile about the axis of rotation 14 of the turbo machine. This can be an external casing, and it can be produced from composite materials. It can be essentially flat. The annular casing 28 can comprise mounting flanges 30, for example annular mounting flanges, for the mounting of the separation nose 22 and/or for its attachment to an intermediate blower casing 32 of the turbo machine. The annular mounting flanges 30 can comprise mounting orifices (not illustrated) in order to permit mounting by means of bolts, or by means of lock bolts.

The composite annular casing 28 can comprise a wall 34 that is generally circular or in a circular arc, of which the sides can be delimited by the flanges 30. The wall 34 can have the form of an arch, with a variation in radius along the axis 14. This evolution of the radius can be reversed. The wall 34 has an interior surface with a double curvature, one of the curvatures being in an axial plane, and the other curvature being in a radial plane. It is understood that the radial plane is perpendicular to the axis 14, the axial plane extending axially and radially.

The wall 34 can have annular mounting surfaces for blades and/or series of mounting orifices (not illustrated) arranged in annular rows for the mounting of the stationary blades 26. The mounting orifices can be equipped with inserts (not illustrated) to reinforce the composite material of the annular casing 28. The inserts can be integrated into the thickness of the wall 34 or the mounting flanges 30.

The annular casing 28 can also be a support for annular layers of an abradable material 36 which are arranged against the wall 34 and which are intended to ensure sealing with the external extremities of the rotor blades 24. The annular mounting surfaces of blades and the layers of abradable material 36 can form a sandwich structure. The annular casing 28 can comprise a metallic material and/or a composite material, for example with an organic matrix and carbon fibers. The annular casing 28 can comprise a main fibrous reinforcement and an auxiliary fibrous reinforcement.

FIG. 3 illustrates a diagram of the method of manufacturing the composite annular casing 28.

The method can comprise the succession, exemplarily in this order, of the following stages: (a) a first stage of positioning the auxiliary fibrous reinforcement (107); (b) a second stage of positioning the main fibrous reinforcement (108); (c) a third stage of closing the injection mould (110); (d) a fourth stage of injection and polymerization (111); and (e) a fifth stage of demoulding and, if required, machining (112).

The first stage 107 can comprise a stage for the supply or implementation of an auxiliary fibrous reinforcement. It can be performed several times in such a way as to provide an auxiliary reinforcement in each inset edge or corner of the mould. Where appropriate, it can involve positioning an auxiliary reinforcement forming a loop bordering the contour of the annular portion. For example, the auxiliary reinforcement can border two axial flanges and two annular flanges.

The second stage 108 can comprise a stage for the supply or implementation of a main fibrous reinforcement. In various alternative embodiments of the invention, the reinforcements can be implemented ahead of the first stage of the method. The main reinforcement can be implemented as part of the mould by stacking fibrous folds or by stacking fibrous folds on an external preforming support. Each fold can be woven in such a way as to possess in advance the form that it will occupy when it is arranged in the mould. The folds can be maintained one against the other by sewing them, or by gluing them in place.

The stages presented above as well as the components that are used are described in more detail in the following paragraphs.

FIG. 4 illustrates a section through the main fibrous reinforcement 38 of a casing, e.g., casing 28. The present approach is capable of being applied to any casing of the turbo machine 2.

The main fibrous reinforcement 38 can possess symmetry of revolution with a revolution profile in relation to the axis 14. It can be flat. It can comprise a fibrous preform 40, which has been formed in such a way as to outline the form of the composite annular casing 28. The preform 40 can have a partition that is circular 42, or in a circular arc, intended to reinforce the wall of the annular casing 28, and at least one, and in various embodiments two, annular mounting flanges 44 which extend radially and which are intended to reinforce the annular flanges of the annular casing 28.

The preform 40 can comprise a stack or a wrapping of different fibrous sheets 46 or fibrous folds 46, which can extend over the partition 42, and over at least one or a plurality of mounting flanges 44. Each fold 46 can extend over an axial fraction of the partition 42. The number of folds 46 can thus vary axially. The number of folds can increase in the downstream direction. At least one fold 46 can be added in order to reinforce the junction between the partition 42 and one of the flanges 44. The preform 40 can comprise a layer including a fibrous mat which, depending on its thickness, has a plurality of levels of fibers, for example at least two, in various embodiments at least four, and in other embodiments at least ten levels of fibers.

The folds 46 can comprise carbon fibers, and/or graphite fibers, and/or glass fibers. Advantageously, the preform can comprise a plurality of types of folds. For example, the preform can comprise a central layer with folds made of carbon fibers, and at least one fold with glass fibers at the surface, if necessary in order to avoid galvanic corrosion.

The folds 46 can be non-woven folds or woven folds, and the latter can comprise fibers and/or bundles of woven fibers in two directions, for example perpendicular. Each bundle of fibers can have a plurality of fibers depending on its cross section. Where appropriate, a fibrous fold can have three directions of weaving.

The preform 40 can comprise at least five folds 46, in various embodiments at least twelve folds 46, and in other embodiments at least twenty folds 46 depending on its thickness. The folds 46 can form a sharp angle at the junction between the partition 42 of the radially exterior side of the preform 40. In the interior, beneath each annular flange 44, the preform 40 can form an annular rounding 50 or elbow, which results in the wrapping of the folds on the sharp angle.

Figure 5:
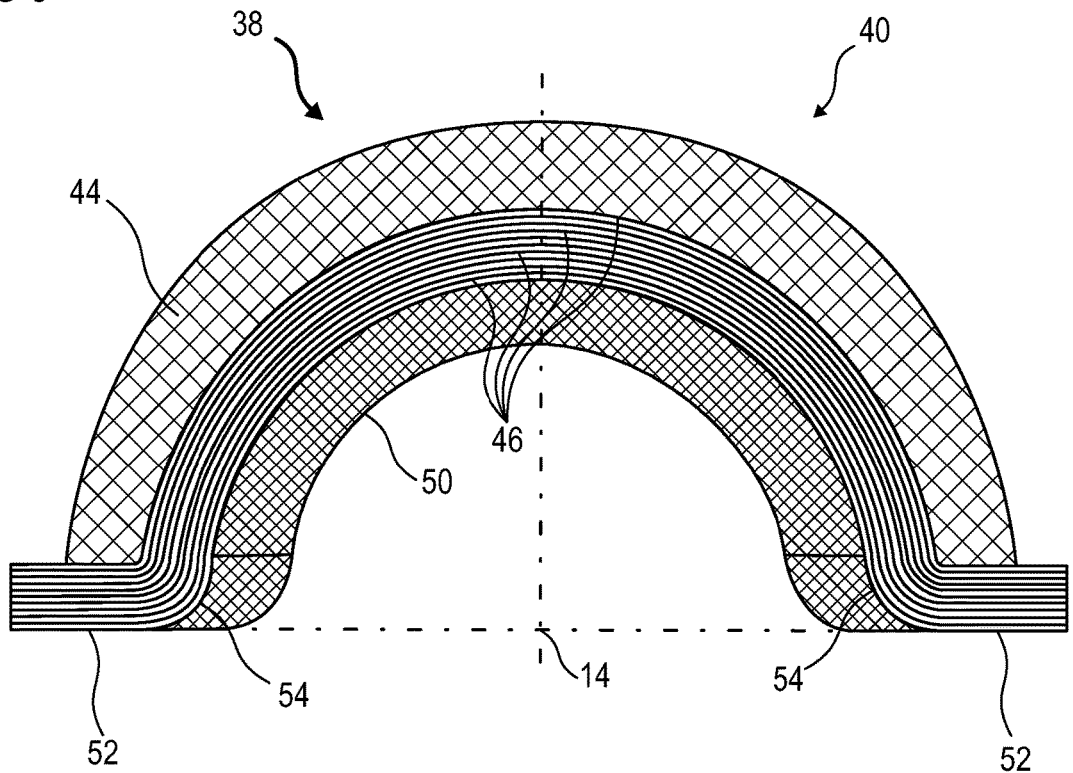
FIG. 5 depicts a section through the main fibrous reinforcement of the casing according to various embodiments of the invention along the axis 5-5 marked in FIG. 4.

FIG. 5 illustrates a section of the main fibrous reinforcement 38 of the composite annular casing 28 along the axis 5-5 marked in FIG. 4.

The annular casing 28 can describe a circle. It can be an annular case-half which describes a semi-circle, or an annular segment of an annular casing which describes a fraction of a circle; for example a quarter, a sixth, or an eighth of a circle.

The annular casing 28 can be divided into one or a plurality of segments which extend in the axis of rotation 14. In order to join the case-halves or the casing segments together, these are equipped with axial mounting flanges 52 intended to be attached one to the other, and can form a smooth circle, in the absence of any step. Consequently, the partition and the wall can be semi-tubes and can extend over a semi-circle, or can be fractions of a circle. The assembly of case-halves or fractions of a casing permits a closed circle to be described.

The main reinforcement 38 of the annular casing can also describe a semi-circle in such a way as to reinforce the case-half. The main reinforcement can have axial mounting flanges 52, which extend radially and which can exhibit a sinusoidal form. Since the main reinforcement 38 can be provided as a successive stack of fibrous folds 46, axial roundings 54 can appear at the side of the wall, at the axial junction with the axial flanges 52, along the entire length of the axial flanges 52.

Figure 6:
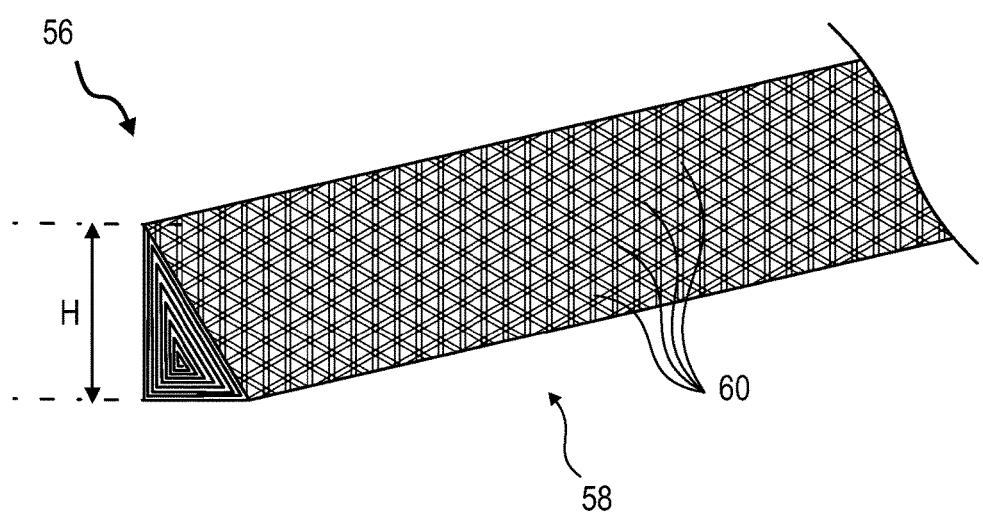
FIG. 6 illustrates in schematic form an auxiliary fibrous reinforcement of the casing according to various embodiments of the invention.

FIG. 6 illustrates a cross section through the auxiliary fibrous reinforcement 56 of the casing.

The auxiliary fibrous reinforcement 56 can comprise a core 58. The core 58 can be a strand of fibers 60, where appropriate woven or braided three-dimensionally. The fibers 60 can describe spirals bordering the edge. The fibers 60 and/or the bundles of fibers of the core 58 can be of the same nature as the fibers of the preform 40. The expression of the same nature can be understood to denote the same material, and/or the same length and/or the same diameter.

The auxiliary reinforcement 56 can comprise portions extending radially or axially beyond the core 58. The core 58 can have a prolongation and a transverse section in a plane perpendicular to its prolongation. Its transverse section can be generally a polygon, such as a triangle, being right-angled and/or isosceles as appropriate. The maximum height H of the triangle of the profile of the core 58 is substantially equal to the thickness of one of the flanges and/or the thickness of the wall of the first preform 40. The height is measured radially when the auxiliary reinforcement 56 is arranged in the mould, and it can be between 60% and 140%, and in various embodiments between 90% and 110%, of the thickness of one of the flanges and/or the thickness of the wall of the first preform. The core 58 has an essentially constant fiber density.

The fibers 60 of the core 58 can be oriented in principle parallel to the prolongation of the auxiliary reinforcement 58. Each of their portions forms an angle of less than 45° in relation to the prolongation of the auxiliary reinforcement 56, and in various embodiments of less than 20°.

Figure 7:
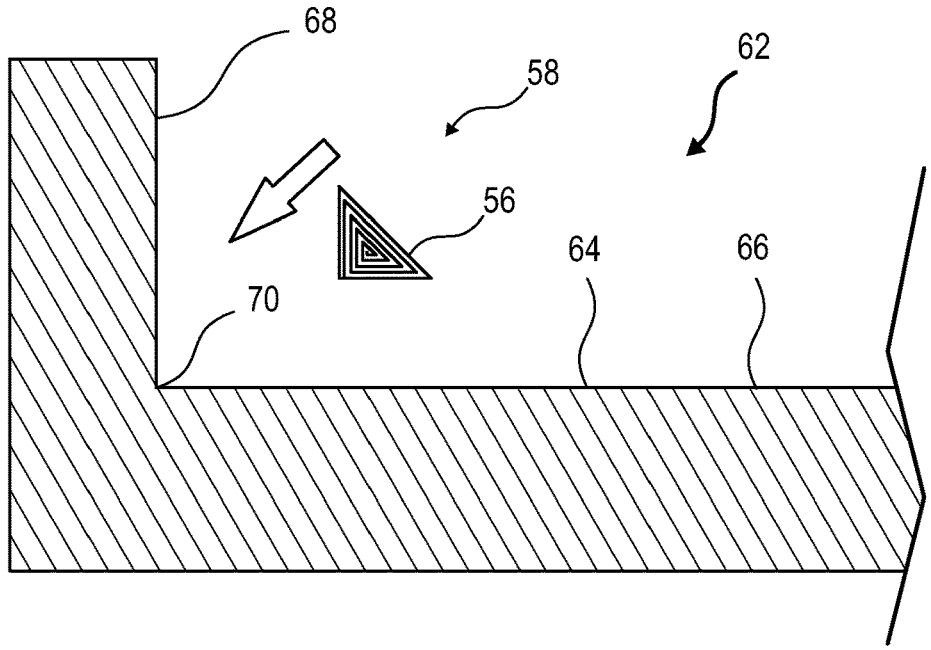
FIG. 7 illustrates the stage of the method of positioning the auxiliary fibrous reinforcement in the mould according to various embodiments of the invention.

FIG. 7 illustrates a first stage of the method of manufacturing the composite annular casing 28 according to various embodiments of the invention. A portion of the mould is illustrated in cross section in a plane passing through an axis which corresponds to the axis 14.

The method utilizes an injection mould with a first mould 62. The first stage comprises the positioning of the auxiliary reinforcement 56 in the interior of the first mould 62, with its core against a moulding surface 64. The mould 62 can be a mould which makes it possible to produce an annular casing, a segment of the annular casing or a half shell. It can have moulding surfaces generated by a revolution profile. The mould 62 can have a generally tubular annular moulding surface 66 which is the conjugate of the interior surface of the annular casing. Although the tubular moulding surface 66 illustrated here is straight, it is obvious that, in practice, it can have any curved form making it possible to produce an axial flange or an annular flange.

The mould 62 can also have a moulding surface extending radially 68, which is the conjugate of a mounting surface of one of the flanges. The tubular surface 66 and the radial surface 68 form a corner 70 or an inset angle 70 at their junction. In order to occupy this corner 70, the auxiliary reinforcement 56 is applied there.

Although only a single auxiliary reinforcement 56 is illustrated, it is feasible to apply others, for example in the area of an opposite flange or in the area of step forms.

Figure 8:
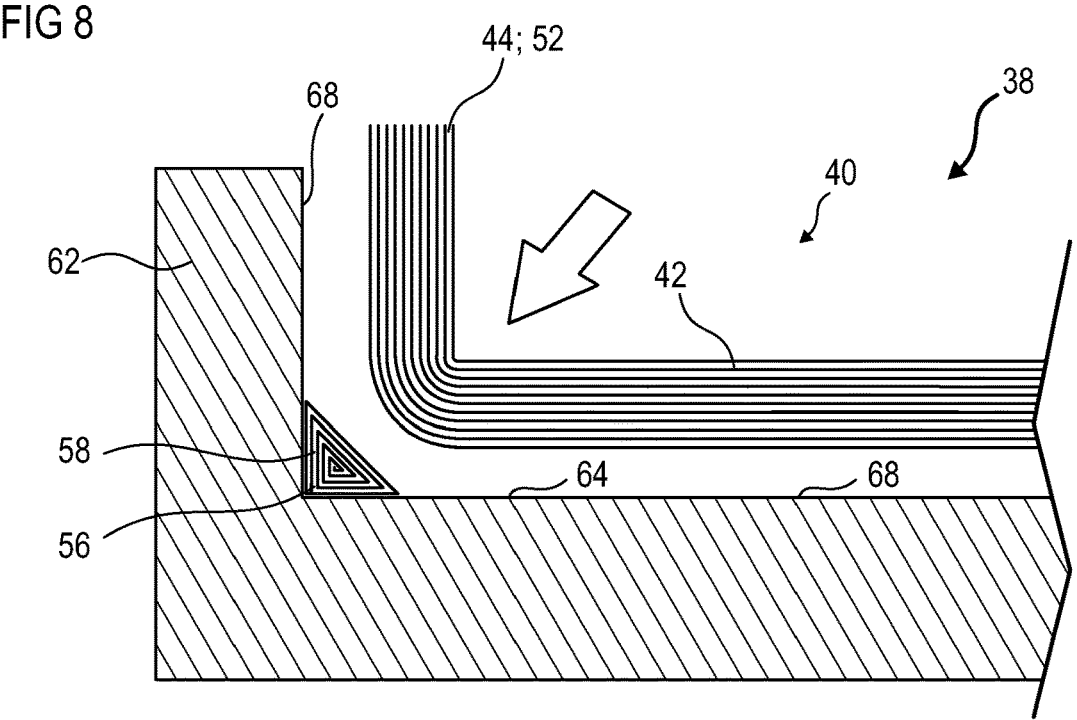
FIG. 8 illustrates the stage of the method of positioning the main fibrous reinforcement in the mould according to various embodiments of the invention.

FIG. 8 illustrates a second stage of the method of manufacturing the composite annular casing according to the invention.

The second stage comprises the positioning of the main fibrous reinforcement 38, in such a way that the latter covers the tubular surface 66 and the radial surface 68 of the mould 62, as well as the auxiliary reinforcement 56, and any other auxiliary reinforcements. During this stage, the main reinforcement 38 enters into contact with the core 58 of the auxiliary reinforcement 56 in the area of a contact surface with a generally straight profile.

FIG. 9 illustrates the main reinforcement 38 and the auxiliary reinforcement 56 when they are both in place in the mould 62.

These reinforcements can adapt their form to the majority, in various embodiments to at least 80%, and other embodiments to the totality of the thickness of the flange 44 or 52 and/or to the majority, for example to at least 80%, and in various embodiments to the totality of the thickness of the partition 42 of the main reinforcement 38. In adapting their form, they are mutually compressed, the long side of the triangle curving inwards, and the rounding (50, 54) at the junction between the flange and the partition 42 of the main reinforcement being crushed, causing it to be flattened. The reinforcements can adapt their form to the majority, in various embodiments to the totality of the radial height of the core of the auxiliary reinforcement.

At the interface 71 with the preforms, fibers of the two preforms can pass through the interface 71, and can be spaced on a same level. They can be interwoven, which improves the consistency in combination with the matrix.

FIG. 10 illustrates a third stage of the method of manufacturing the composite annular casing according to the invention.

The third stage of the method comprises the closing of the injection mould, the latter comprising at least a second mould 72 or backing mould 72 which is applied against the main reinforcement 38 and compacts it. The backing mould 72 can be a male mould. The backing mould 72 can reduce the thickness of the partition and/or the thickness of the flange (44, 52) of the main reinforcement 38. The mould 62 and the backing mould 72 define between them a moulding cavity essentially reproducing the form of the annular casing 28. During this stage, the core 58 can be compacted once more. The effect of closing of the mould can permit the thickness of the preforms to be reduced by at least 5%, and in various embodiments by at least 20%.

Figure 11:
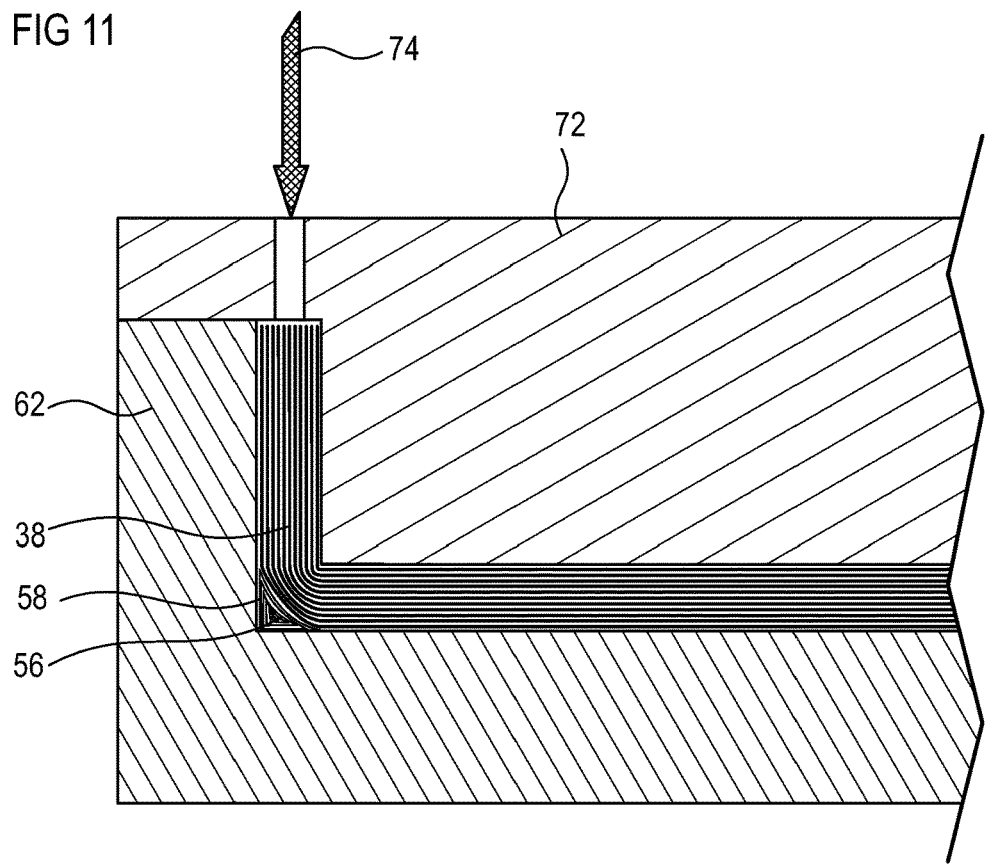
FIG. 11 illustrates the stage of the method of injection of a resin into the mould according to various embodiments of the invention.

FIG. 11 illustrates a fourth stage of the method of manufacturing the composite annular casing according to the invention.

The fourth stage comprises the injection of a resin 74, in particular an organic resin, into the injection mould. The resin 74 can be a thermoplastic resin such as epoxy, polyetherimide (PEI), polyether ether ketone (PEEK). The injection can involve impregnating the preforms, according to a method of the RTM type (English acronym for Resin Transfer Moulding). The method can comprise an injection of a charged resin. If necessary, the injection can be assisted by aspiration.

Following the injection, the mould can be maintained for a period of at least one hour at a temperature above 50° C., and in various embodiments above 120° C. Following these stages, the resin is polymerised and hardens and is able to adhere to the reinforcements, thereby forming a solid body.

Figure 12:
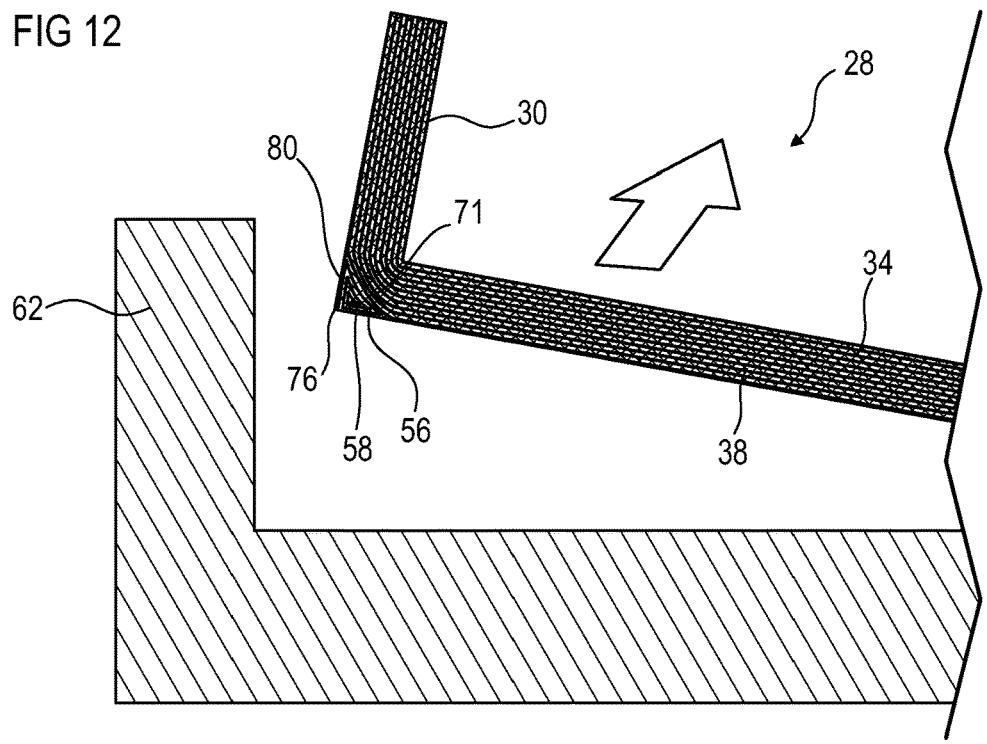
FIG. 12 illustrates the stage of the method of demoulding of the casing according to various embodiments of the invention.

FIG. 12 illustrates a fifth stage of the method of manufacturing the composite annular casing 28 according to the invention.

The fifth stage comprises the demoulding of the composite annular casing 28. In a first stage, the counter mould 72 is withdrawn from the mould 62, and a demoulding force is then applied to the casing 28 in order to extract it from the mould.

The casing 28 can be machined after moulding. It can be perforated in the area of the flanges 30 in order to produce mounting orifices, and/or in the area of the wall 34 in order to permit the assembly of blades. If necessary, the axial and/or annular flanges can be cut out in order to remove the heterogeneous extremities, which were added specifically to improve the quality of the finished flanges.

Once it has been polymerized, the matrix connects the main reinforcement 38 and the auxiliary reinforcement 56. It has a continuity of material in the interface 71 between the reinforcements (38; 56), which permits them to be joined together. This configuration is conducive to the anchoring of the reinforcements. The core of the auxiliary reinforcement 56 comprises fibers which extend radially, for at least 10%, in various embodiments for at least all, and other embodiments for at least two times the thickness of the wall 34. These fibers improve the resistance under radial compression of the edge and permit the edge to form a block. These fibers can extend from an edge 76 of the casing 28 as far as the main reinforcement 38.

The main fibrous reinforcement 38 extends in a continuous manner along the wall 38 and the flange 30 forming an angled and generally rounded portion in the area of the edge. The core 58 extends along the edge 76 in such a way as to occupy the volume between the edge and the angled portion of the main reinforcement 38. The interface 71 can have a generally curved and substantially flattened profile. The reinforcements (38 and 56) can be configured in such a way that the casing 28 has a continuity and a homogeneity of the fiber density in the junction 80 between the flange 30 and the wall 34 and/or along the surfaces of the junction 80. This homogeneity improves the mechanical strength and the endurance of the casing 28, which can be subjected to vibrations, and to chemical attack at a temperature above 170° C., during the operation of the turbo machine.

The general radius of the rounded interface and/or the thickness of the wall is/are greater than 1%, in various embodiments greater than 2%, in other embodiments greater than 4%, and, where appropriate, greater than 6% of the radius of the sharp edge.

The casing 28 has a sharp edge 76 forming a salient angle. This edge can be integrated into the turbo machine, without the need for additional machining. The edge 76 can be generally perpendicular, which permits a smooth junction to be produced when it is brought into alignment with a corresponding edge. The joining together of the two edges makes it possible to provide a surface for guiding a flow in the absence of any projection which could have an adverse effect on the smoothness of the flow. This joint is also able to form a mounting zone that is free from roughness, for example in order to be able to support a blade platform against it with a view to its positioning and its mounting.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method of manufacturing a composite annular casing of a turbo machine including a wall having one of a substantially circular profile and a circular arc, a mounting flange extending radially from one side of the wall and forming together with the wall an edge, said method comprising:

positioning an auxiliary reinforcement in a corner of a moulding surface of an injection mould, the corner forming the edge, the auxiliary reinforcement including a contact surface;

positioning a main reinforcement against the moulding surface such that its form is adapted to that of the auxiliary reinforcement in an area of the corner, the main reinforcement being produced with a rounding structured to come into contact with the contact surface of the auxiliary reinforcement;

closing of the injection mould such that the rounding of the main reinforcement is flattened by the auxiliary reinforcement, and the contact surface of the auxiliary reinforcement is curved inwards by the main reinforcement;

injecting a resin into the injection mould and polymerization of the resin; and demoulding the composite annular casing.

2. The method according to claim 1, wherein in the course of closing of the injection mould, at least one of:

the main reinforcement is compacted, and the main reinforcement and a core are compacted mutually.

* * * * *